Figure 1:
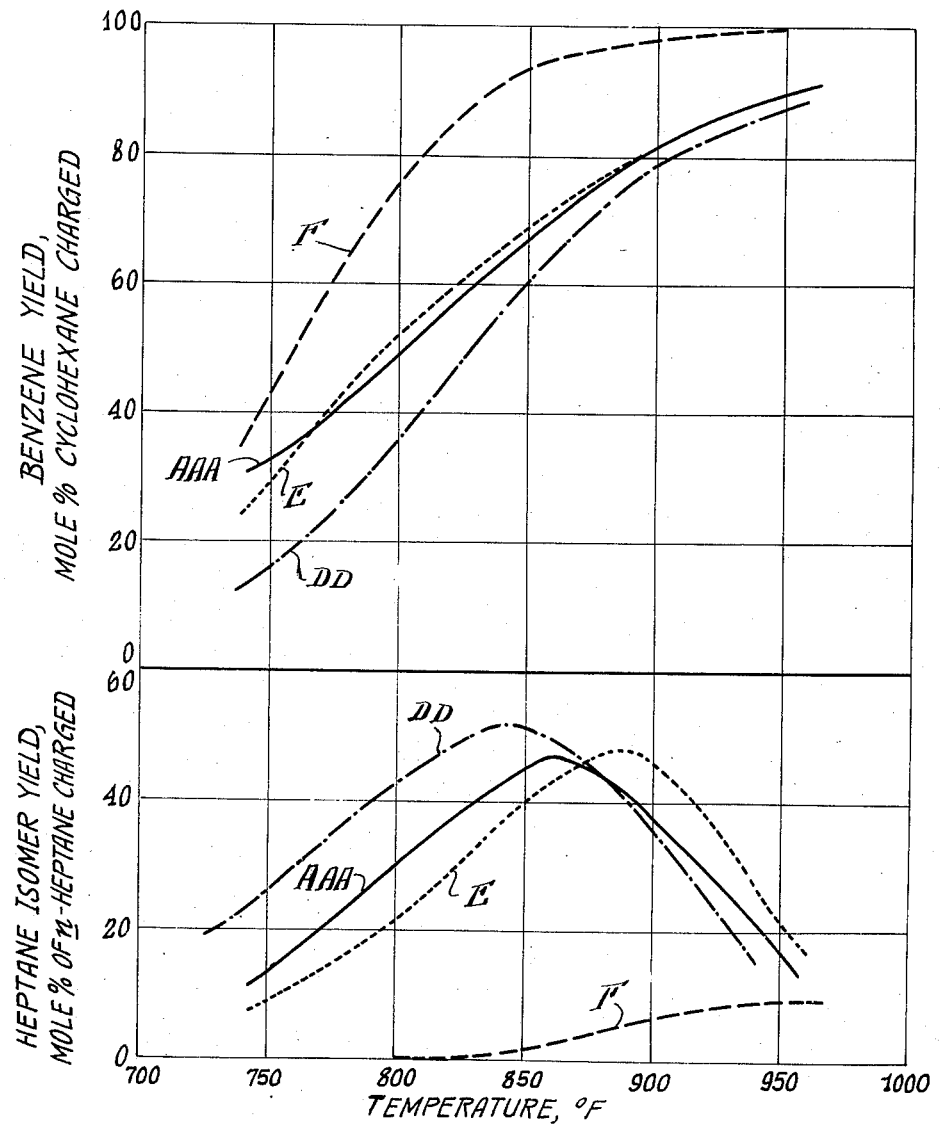

United States Patent Office 2,849,378
Patented Aug. 26, 1958

2,849,378

CATALYTIC REFORMING WITH A HIGH SURFACE AREA CATALYST

Richard W. Baker, Wenonah, N. J., Frank G. Ciapetta, Upper Darby, Pa., and Robert M. Dobres, Wenonah, N. J., assignors to Socony Mobil Oil Company, Inc., a corporation of New York Application March 31, 1954, Serial No. 420,092

20 Claims. (Cl. 196—50)

This invention relates to the catalytic reforming of mixtures of hydrocarbons. It is more particularly concerned with a reforming process whereby hydrocarbon fractions are converted into high yields of gasoline having high octane ratings, and with certain types of supported platinum or palladium catalysts utilized in the reforming process.

As is well known to those familiar with the art, hydrocarbon fractions which are subjected to reforming (such as naphthas, gasoline, and kerosine) are comprised, predominantly, of mixtures of normal and moderately-branched paraffinic hydrocarbons with cycloparaffins, i. e., naphthenic hydrocarbons (cyclohexanes, methylcyclopentanes, etc.), together with small amounts of aromatic hydrocarbons. In order to convert such hydrocarbon fractions into gasoline having high octane ratings, two general classes of reactions must occur simultaneously.

Normal and slightly branched-chain paraffinic hydrocarbons, such as are found in straight-run gasolines, have relatively low octane ratings. The highly branched-chain paraffins, on the other hand, have excellent octane ratings. Accordingly, one requisite of a good overall reforming process is to convert the paraffinic hydrocarbons into more highly-branched paraffins of the same molecular weight, i. e., they must be isomerized. In effecting the isomerization reaction, however, cracking always occurs.

In reforming operations, cracking, of course, should be minimized because the lower paraffins resulting from cracking, i. e., methane, ethane, and propane, cannot be used in gasoline. Accordingly, they constitute a loss. The butanes, which also are formed by cracking, tend to increase the octane ratings of gasoline. Another factor, however, i. e., the maximum permissible vapor pressure (usually expressed as the Reid vapor pressure), sharply limits the amount of butane that can be present in the finished gasoline, regardless of the increase in octane rating effected by is presence. Cracking also produces coke. This is disadvantageous, because coking shortens the active life of the catalyst and because it means decreased yields of gasoline.

The criterion of a good reforming process is the production of high octane gasolines in maximum yields. It will be apparent to those skilled in the art, therefore, that the production of coke, hydrogen, methane, ethane, and propane, and of butanes, in amounts exceeding the amount tolerable in the finished gasoline, decreases the yield of gasoline and, hence, the efficiency of the process. Accordingly, it will be appreciated that it is highly desirable to isomerize the paraffinic constituents of the charge stock to branched-chain hydrocarbons of high octane rating, while maintaining cracking at a minimum.

Aromatic hydrocarbons have, in general, higher octane ratings than the saturated or unsaturated cycloaliphatic hydrocarbons. Another requisite of a good reforming process, therefore, is to produce aromatic hydrocarbons in good yields. This involves the dehydrogenation of the cyclic hydrocarbons and the dehydrocyclization of the paraffinic hydrocarbons. Aromatic hydrocarbons are produced also by isomerizing the alkylcyclopentanes to cyclohexanes which are then dehydrogenated to form aromatic hydrocarbons. As is well known, aromatization, i. e., dehydrogenation and dehydrocyclization, occurs at relatively high temperatures.

A conversion operation which involves the aforementioned reactions, i. e., isomerization, dehydrocyclization, aromatization, dehydrogenation, is known to the art as a "reforming" process. When a reforming process is carried out in the presence of hydrogen under pressure, the formation of coke is inhibited. Such a reforming process is sometimes known as hydroforming. An increase in hydrogen pressure, however, results in increasing the temperature at which aromatization can occur. On the other hand, the temperature of isomerization is independent of pressure. Therefore, the use of a catalyst which provides maximum isomerization at relatively low temperatures is disadvantageous in a reforming operation wherein the pressure conditions have elevated the temperature requirements of the aromatization reaction. Stated differently, in order to achieve maximum conversion into high-octane gasoline, there must be effected maximum isomerization, with little cracking, at temperatures sufficiently high to promote good conversion into aromatic hydrocarbons. In this manner, the full advantages of the isomerization and of the aromatization reactions are realized.

As is well known to those familiar with the prior art, it has been proposed to reform low-octane hydrocarbon fractions by contacting them with catalysts comprising platinum or palladium supported on active cracking components. It has also been proposed to effect reforming in the presence of catalysts comprising platinum or palladium deposited upon cracking components having low surface areas, viz., between about 10 and about 65 square meters per gram. It is significant to note that, in both instances, it has been taught that the carrier for the platinum or palladium must have a substantial cracking activity. Accordingly, as silica is not a cracking component, platinum or palladium deposited on silica has been considered to be inactive as a catalyst for reforming operations. Even when the support is a low-surface area silica-alumina cracking component, the teaching of the prior art is that such supports should have a surface area of less than 65 square meters per gram.

As is well known in the art, the cracking activity of a material is expressed in terms of the percent by volume of a standard hydrocarbon charge which is cracked, under specific operating conditions in the "Cat. A" test. A description of this test is set forth in National Petroleum News, 36, page P. R.–537 (August 2, 1944). The unit for rating the cracking activity of a material is called the "Activity Index" (A.I.). In general, a material utilizable as a cracking catalyst must possess an Activity Index of at least about 25.

In co-pending application Serial No. 373,516, filed August 11, 1953, of which this application is a continuation-in-part, it was disclosed that superior reforming was achieved when the reforming operation was carried out in the presence of a catalyst comprising platinum or palladium deposited on silica having a surface area of between about 100 square meters per gram and about 250 square meters per gram, provided that specified small amounts of alumina were cogelled with the silica. In this co-pending application, it was disclosed that in a catalyst in which the carrier was prepared by cogelation as distinguished from impregnation, there is a critical relationship between the alumina content and the surface area of the carrier or support. The co-pending application taught that there is a difference between the amount of alumina utilizable in a catalyst that comprises a cogelled carrier and the amount of alumina permissible in a catalyst that comprises a carrier produced by impregnating silica with alumina.

It has now been found that it is possible to correlate the amounts of alumina in the catalyst and its surface area, whether the carrier is produced by cogelation, by impregnation, or by a combination of cogelation and impregnation. It has been discovered that hydrocarbon fractions having low octane ratings can be converted into hydrocarbon fractions having very high octane ratings, in good yields, by subjecting them to reforming in the presence of hydrogen and of a catalyst comprising platinum or palladium deposited upon silica which has small amounts of alumina composited therewith and which has substantially no cracking activity; the relationship between the alumina content and the surface area of the catalyst being controlled within defined limits.

Accordingly, it is an object of this invention to provide an improved reforming process. Another object is to provide a novel catalyst for carrying out the reforming operation. A further object is to provide a process for converting hydrocarbon fractions boiling in the gasoline range which have low octane ratings into gasolines having high octane ratings, through a reforming process that involves the use of catalysts comprising platinum or palladium deposited on silicas which have small amounts of alumina composited therewith. A specific object is to provide a reforming process utilizing catalysts comprising platinum or palladium deposited upon silica having composited therewith minor amounts of alumina and having substantially no cracking activity; the relationship between the alumina content and the surface area of the catalyst being controlled within specified limits, and being dependent upon whether the carrier is prepared by cogelation, by impregnation or by both cogelation and impregnation. A further specific object is to provide a novel reforming catalyst comprising platinum or palladium deposited upon a carrier having substantially no cracking activity and comprising silica having composited therewith minor amounts of alumina; the alumina content being correlated with the surface area within specified limits.

Figure 2:
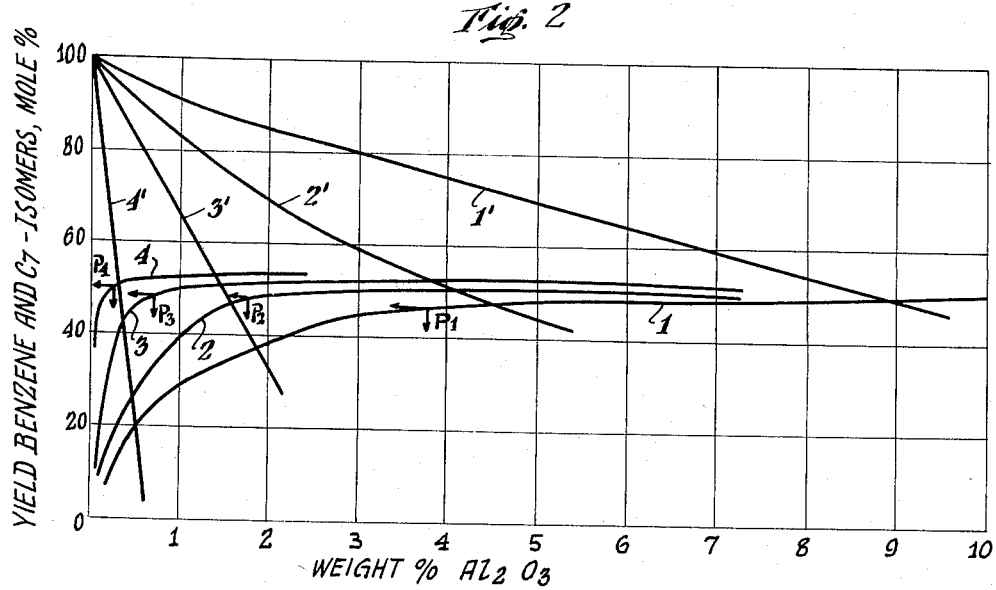
Figure 3:
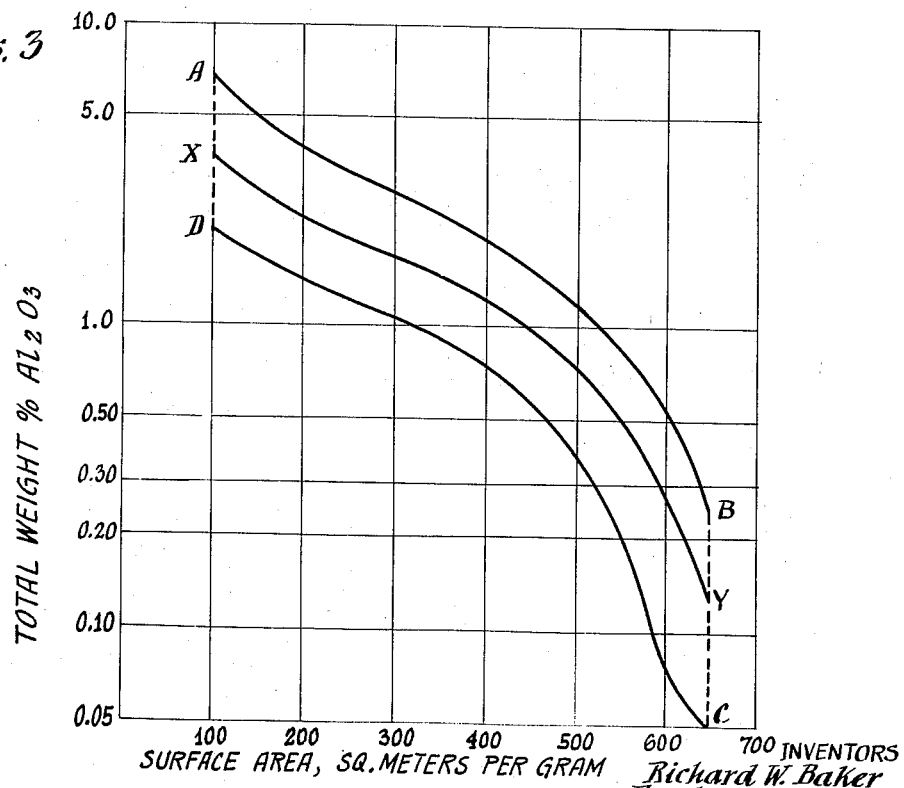
Figure 4:
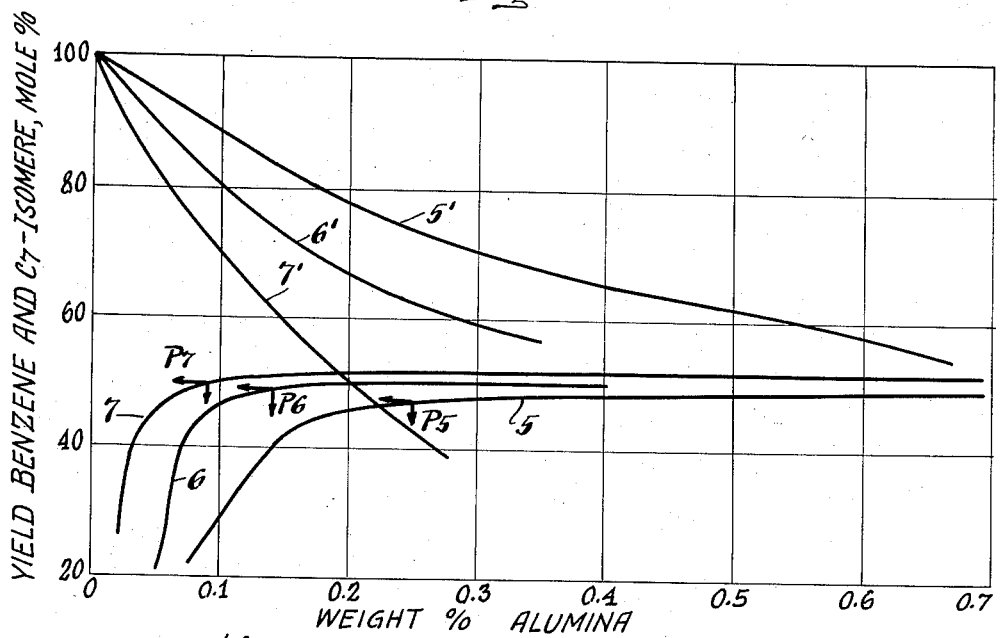
Figure 5:
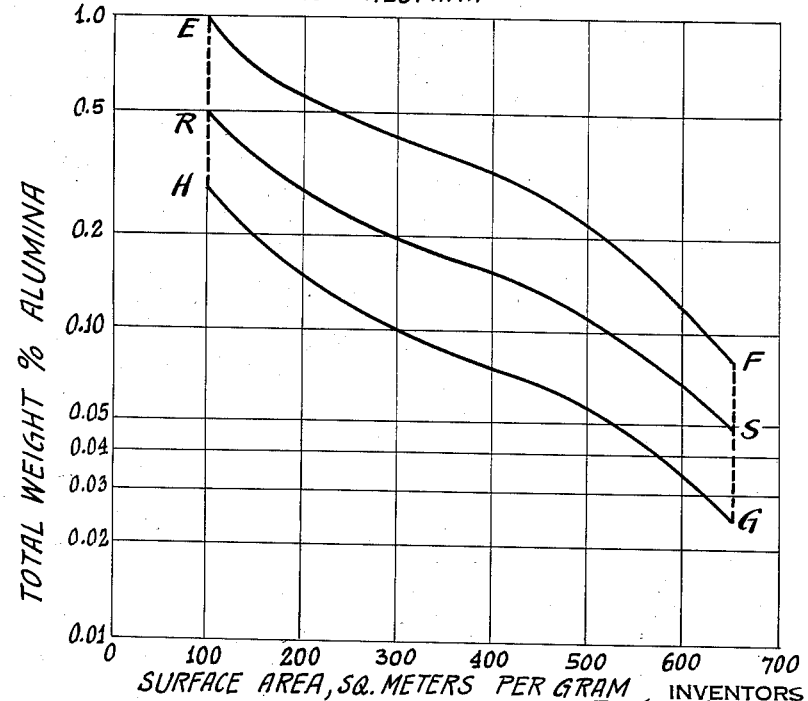
Figure 6:
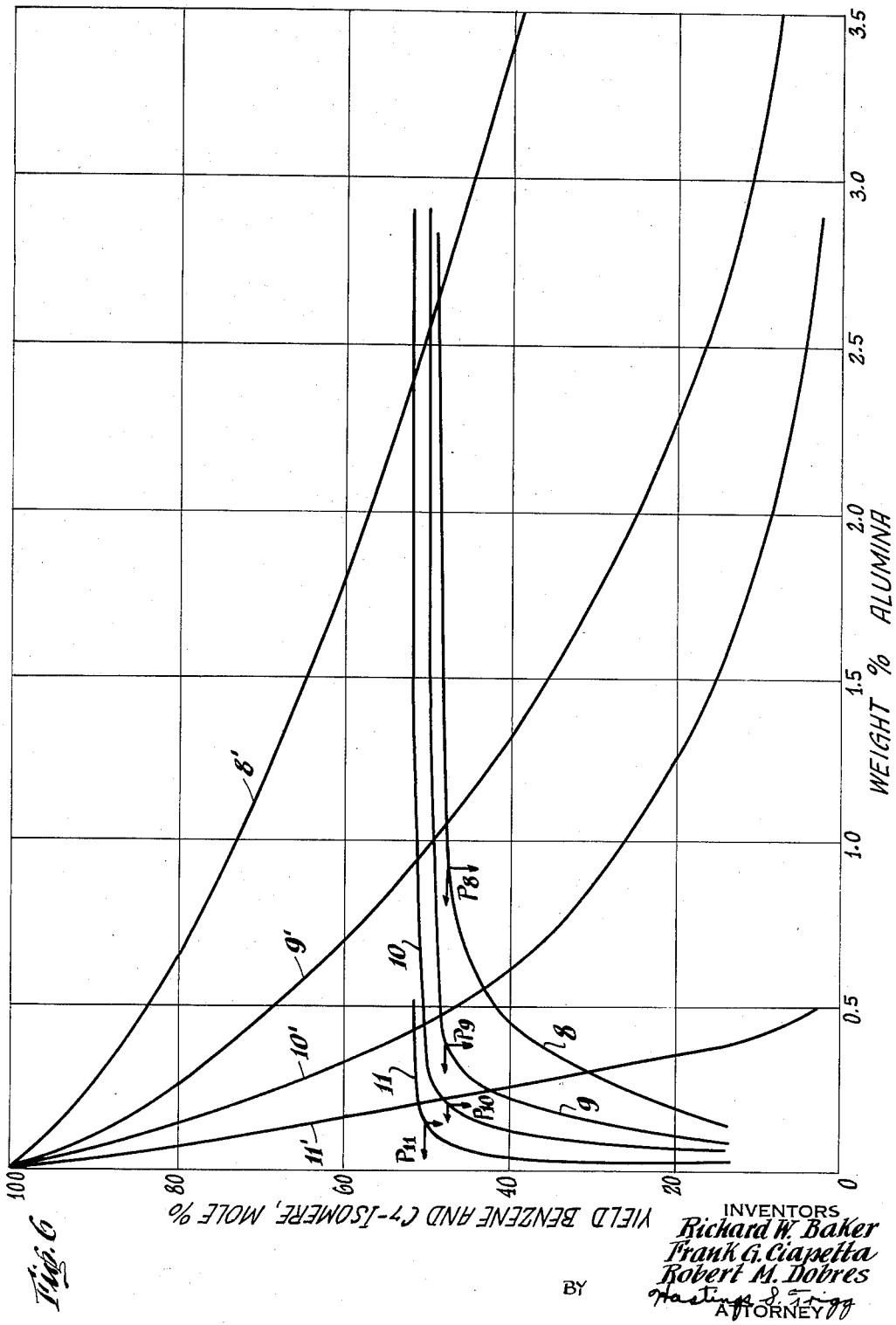
Figure 7:
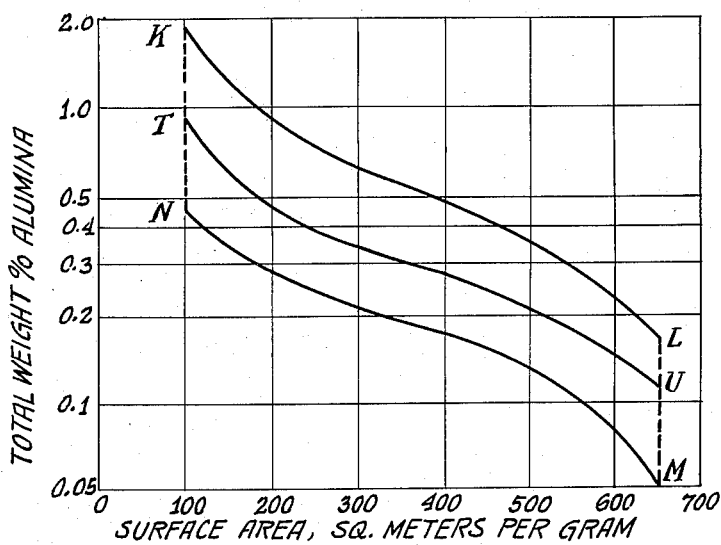
Figure 8:
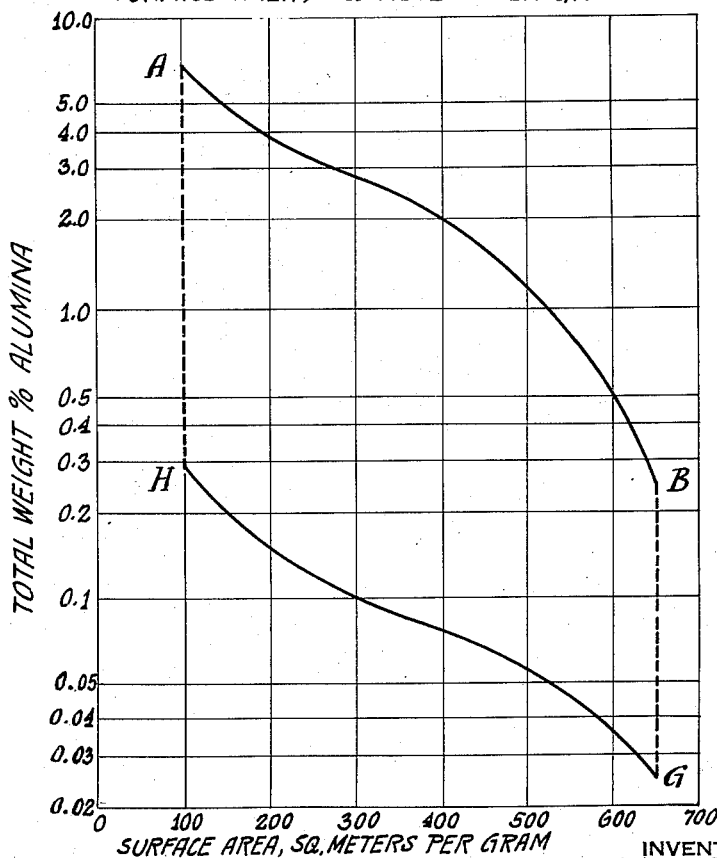
Figure 9:
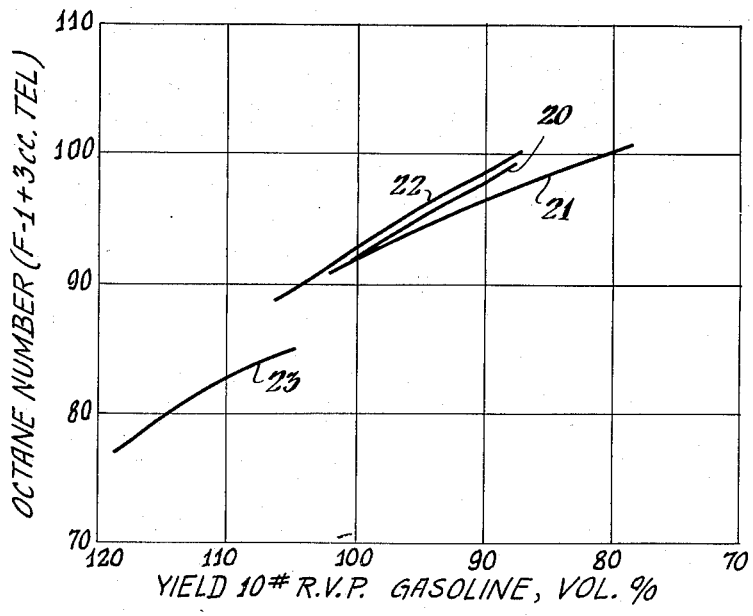
Figure 10:
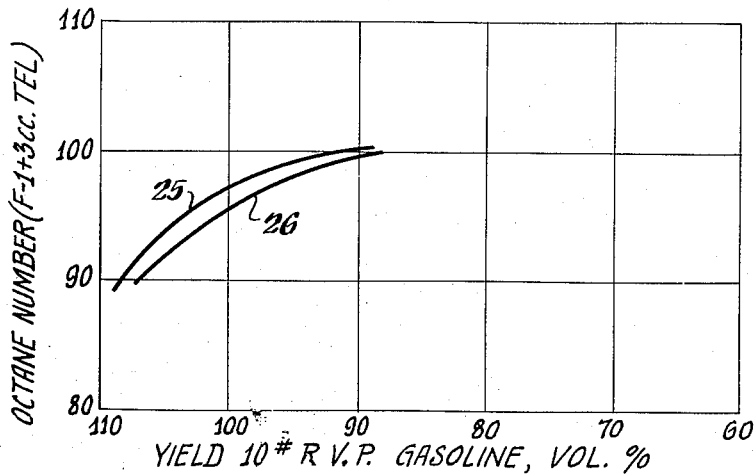

Other objects and advantages of this invention will become apparent to those skilled in the art from the following detailed description, considered in conjunction with the drawings, wherein:

Figure 1 presents a series of curves showing graphically the relationship between the temperature and the percent heptane isomer yield and between the temperature and the percent benzene yield, both obtained by using a blend of pure hydrocarbons which was contacted with catalysts comprising platinum deposited upon various types of supports, under reforming conditions;

Figure 2 presents a series of curves showing graphically the relationship between the alumina content of the catalyst and the maximum yield of heptane isomers, and the alumina content of the catalyst and the yield of benzene at maximum heptane isomer yield, both obtained by using a blend of pure hydrocarbons that was contacted with a number of catalysts of various surface areas and comprising platinum deposited upon carriers prepared by cogelling silica with alumina, under reforming conditions;

Figure 3 shows graphically the relationship between the alumina content and the surface area of platinum catalysts comprising silica supports that have alumina cogelled therewith, to effect reforming in accordance with this invention;

Figure 4 presents a series of curves showing graphically the relationship between the alumina content of the catalyst and the maximum yield of heptane isomers, and the alumina content of the catalyst and the yield of benzene at maximum heptane isomer yield, both obtained by using a blend of pure hydrocarbons that was contacted with a number of catalysts of various surface areas and comprising patinum deposited upon carriers prepared by cogelling silica with alumina, acid-treated and then further impregnated with alumina, under reforming conditions;

Figure 5 shows graphically the relationship between the alumina content and the surface area of platinum catalysts comprising silica supports that have alumina cogelled therewith, acid-treated and then further impregnated with alumina, to effect reforming in accordance with this invention;

Figure 6 presents a series of curves showing graphically the relationship between the alumina content of the catalyst and the maximum yield of heptane isomers, and the alumina content of the catalyst and the yield of benzene at maximum heptane isomer yield, both obtained by using a blend of pure hydrocarbons that was contacted with a number of catalysts of various surface areas, and comprising platinum deposited upon carriers prepared by cogelling silica with alumina, and followed by further impregnations with alumina, under reforming conditions;

Figure 7 shows graphically the relationship between the alumina content and the surface area of platinum catalysts comprising silica supports that have alumina cogelled therewith and impregnated thereon, to effect reforming in accordance with this invention;

Figure 8 shows graphically the relationship between the maximum alumina content and the surface area of platinum catalysts comprising silica supports that have alumina cogelled therewith and the minimum alumina content and the surface area of platinum catalysts comprising supports prepared by cogelling silica and alumina, acid-treated and then further impregnated with alumina, to effect reforming in accordance with this invention;

Figure 9 presents a series of curves showing graphically the relationship between the yield of 10-pound RVP gasoline and the leaded octane number (F–1+3 cc. TEL) of the gasoline produced by subjecting a typical petroleum naphtha to reforming in the presence of various platinum catalysts of this invention, and of a platinum catalyst not within the scope of this invention; and Figure 10 presents a series of curves showing graphically the relationship between the yield of 10-pound RVP gasoline and the leaded octane number (F–1+3 cc. TEL) of the gasolines produced by subjecting sulfur- and olefin-containing naphthas to reforming in the presence of a catalyst of this invention.

Broadly stated, the present invention provides (1) a process for reforming low-octane hydrocarbon fractions boiling in the gasoline range, which comprises contacting these hydrocarbon fractions, under specified reforming conditions, and in the presence of hydrogen, with a catalyst having a surface area varying between about 650 square meters per gram and about 100 square meters per gram and containing between about 0.025 percent, by weight, and about 7.0 percent, by weight, of alumina, and containing between about 0.05 percent, by weight, and about 2 percent, by weight, of platinum or palladium or both, deposited upon a carrier that includes silica composited with alumina; the alumina content and the surface area of the catalyst being correlated as to define a point falling within the area delineated by points A, B, G, and H in Figure 8; and (2) the novel reforming catalysts used in the process defined in (1).

The catalysts of this invention comprise platinum or palladium or both deposited upon carriers which include silica containing small amounts of alumina. The manner of incorporating the alumina in these carriers is critical from the standpoint of the correlation that is required in accordance with the present invention between the alumina content and the surface area of the catalyst. The alumina can be incorporated into the silica carriers by cogelation, by impregnation, or by both cogelation and impregnation.

The carriers comprising silica cogelled with alumina can be prepared by the usual methods for making cogelled composites. For example, the carrier can be prepared by dispersing a silica hydrogel in an aqueous solution containing the required amount of a salt of aluminum and then adding a sufficient amount of aqueous ammonia to precipitate the alumnia. In another method, a silica hydrogel can be prepared by adding an aqueous solution of a strong acid, such as sulfuric, nitric, or hydrochloric acid, to an aqueous solution of sodium silicate, to precipitate the silica hydrogel. After the silica hydrogel is washed with water to remove sodium ions, it can be composited with the proper amount of purified alumina hydrogel. This alumina hydrogel can be prepared by adding ammonia, or an alkali-metal hydroxide, to an aqueous solution of an aluminum salt, e. g., aluminum nitrate, sulfate, or chlorides, and washing the hydrogel. Still another method for preparing the cogelled carriers involves, adding an aqueous, acidic solution containing the required amount of an aluminum salt to an aqueous solution of sodium silicate, thus precipitating the silica and the alumina simultaneously. The latter type of operation can be carried out in accordance with the method disclosed in United States Letters Patent No. 2,384,946 to produce the cogelled carrier in a hydrogel bead form. The bead hydrogel is then exchanged with an aqueous acid solution to remove sodium ions. Finally, it is washed with water.

A preferred method for making the carriers used in the catalysts of this invention is to prepare a silica hydrogel bead, using the ion-exchange method described in United States Letters Patent No. 2,384,946. An aqueous solution of sodium silicate is mixed rapidly with an aqueous sulfuric acid solution; the composited solution falling into a column of oil wherein gelation occurs, to produce silica hydrogel beads. The beads are then ion-exchanged with an aqueous acidic solution containing the required amount of an aluminum salt, thus removing the sodium ions and incorporating alumina into the hydrogel beads. The exchanged beads are then washed with water before drying and calcining. This ion-exchange method produces carriers which are equivalent in activity to carriers that are produced by direct cogelation. Therefore, these carriers are the equivalent of the cogelled carriers.

The carriers comprising silica impregnated with alumina and those comprising cogelled silica and alumina that are further impregnated with alumina can be prepared by the usual methods for preparing impregnated catalyst composites. Such carriers can be prepared by dispersing a calcined silica gel, or a calcined composite of cogelled silica and alumina, in an aqueous solution containing the required amount of a salt of aluminum, and then adding sufficient aqueous ammonia to precipitate the alumina. The support can also be prepared by mixing a wet alumina hydrogel with a calcined silica gel, or a calcined, cogelled composite of silica and alumina, to form an intimate mixture of the two components.

A preferred method of making these carriers is first to prepare a silica, or cogelled silica and alumina, hydrogel bead, according to the method described in United States Letters Patent No. 2,384,946. The hydrogel beads are washed with water and then calcined at about 1000° F. The calcined beads are subsequently impregnated with an aqueous solution containing the required amount of an aluminum salt, as aforedescribed, and, finally, the impregnated beads are dried and calcined at about 1000° F.

In all the methods of preparation described, the final composites are washed thoroughly with water to remove any alkali-metal ions which may be present. The composites are then dried at about 220° F. and, finally, calcined in air at 900–1400° F. for about one hour to about 24 hours.

It is preferred to adjust the surface area of the carrier before depositing the platinum or palladium or both thereon. In the case of the carriers prepared by impregnation, this adjustment can be made before the impregnation operation. This can be effected by any of the methods known to the art. For example, it can be accomplished by steaming the carrier at temperatures of between about 900° F. and about 1400° F., under steam pressures of between about atmospheric and about 100 pounds per square inch. Ordinarily, the time of treatment will be between about 50 hours and about 100 hours, although longer or shorter periods can be used. The surface area can also be lowered by treating the carrier at temperatures of between about 1600° F. and about 1800° F. without the use of steam. In still another method, the carrier can be treated with water at 300–800° F. under pressures of 300–3000 pounds per square inch gauge, for periods of time varying between about 1 hour and about 100 hours. The term "surface area" as used herein means the surface area of the catalyst as determined by the adsorption of nitrogen according to the method of Brunnauer et al., J. Am. Chem. Soc. 60, 309 et seq. (1938).

The amount of platinum or palladium or both will vary between about 0.05 percent and about 2 percent, by weight of the final catalyst. The platinum or palladium can be present in the catalyst alone or in admixture with other metals. The platinum or palladium can be deposited upon the carrier in any manner known to the art. A preferred method is to admix the dried, non-cracking carrier with an aqueous solution of chloroplatinic or chloropalladic acid, or of the ammonium salts of these acids, in amounts such that the solution will be completely taken up by the carrier and in concentrations such that will produce the desired amount of metal in the finished catalyst. The mixture is then dried, usually at temperatures of about 200–250° F. for about 16 hours, and treated with hydrogen at temperatures of about 400–500° F. for about 2–4 hours, to reduce the chloride to the metal and further heated in hydrogen at temperatures of 900–1000° F. for about 2–24 hours, to activate the catalyst.

As was stated hereinbefore, an important feature of the present invention is that, with respect to the alumina content of the finished catalyst, it is important whether the carrier is prepared by cogelation, by impregnation, or by a combination of cogelation and impregnation. The relationship between the surface area of the catalyst and the alumina content is very critical and this relationship is dependent upon the method by which the carrier is prepared. This criticalness is illustrated by the results obtained in the following examples:

CATALYSTS PREPARED WITH COGELLED CARRIERS

Catalyst Preparation

*Example 1.*—An aqueous solution of sodium silicate (158 g. $SiO_2$ per liter) was mixed with an aqueous solution containing 9.54% by weight concentrated $H_2SO_4$ (96.3%) and 0.23% by weight hydrated aluminum sulfate, in a mixing nozzle, at a temperature of about 87° F. The rate of flow of the sodium silicate was 460 cc./min. and that of the acidic aluminum sulfate solution was 445 cc./min. The mixture of solutions emerging from the mixing nozzle had a pH of 7.1 and was allowed to fall through a column of oil, wherein gelation was completed in 3 seconds. The hydrogel thus produced was in bead form. The beads were aged in water at about 40° F. for three hours. Then, in order to remove alkali-metal ions, they were base-exchanged with nine separate treatments with fresh, aqueous solutions containing about 0.5% by weight ammonium sulfate. Base-exchanging was accomplished by covering the beads with the ammonium sulfate solution for about 2 hours, and then draining off the solution. The base-exchanged beads were dried in superheated steam at about 250° F. for 3½ hours. Finally, the dried bead carrier was calcined in air, for 3 hours, at about 1000° F. The carrier thus prepared contained about 0.4% $Al_2O_3$ by weight.

*Example 2.*—The bead form carrier, prepared as described in Example 1, was crushed to pass through a 14- mesh screen and the material retained on a 25-mesh screen (U. S. Standard Screen Series) was used for catalyst preparation. In batches of 250 cc., the material was barely covered with a 0.0282 molar aqueous solution of chloroplatinic acid and permitted to stand for about one hour, with intermittent stirring. Then, the excess chloroplatinic acid solution was removed by centrifuging. The thus-impregnated carrier was heated for 17 hours at 230° F., in a covered vessel, and then cooled to room temperature. Subsequently, the carrier was heated from 80° F. to about 450° F. during a 2-hours period, in the presence of nitrogen which was passed through it at a rate of 1 cc. per cubic centimeter of carrier per minute. When the temperature reached 450° F., the nitrogen stream was replaced with a hydrogen stream (at the same flow rate), and heating was continued at 450° F. for two hours. Then, the temperature was raised to 950° F. and maintained at this level for another two hours. The catalyst, thus activated, was cooled to room temperature in a nitrogen atmosphere. The pertinent properties of the catalyst thus prepared (catalyst E) are set forth in Table I.

*Example 3.*—The carriers for catalysts B, C, D, H, and I were prepared in a manner similar to that described in Example 1, except that suitable adjustments of the concentration of the acidic aluminum sulfate solution were made to produce the desired alumina concentration in the finished carriers. These carriers were then impregnated with chloroplatinic acid solutions (of suitable concentrations to produce the desired platinum content in the finished catalyst), dried and activated, using the procedures described in Example 2. The pertinent properties of these catalysts (B, C, D, H, and I) are set forth in Table I.

*Example 4.*—In order to produce the carrier for catalysts J and L, portions of the carrier used in preparing catalyst I were hydrothermally treated to reduce the surface area. For this purpose, the carrier was suspended in a 5-gallon autoclave, over 1750 g. of distilled water. Each portion of the carrier was then treated in the autoclave for one hour at a temperature of about 500° F., using a pressure of 100 pounds per square inch gauge, for the carrier of catalyst J, and 700 pounds per square inch gauge, for the carrier of catalyst L. The thus-treated carriers were calcined in air for 16 hours at 1000° F., and crushed to pass a 14-mesh screen. The material retained on a 25-mesh screen was used for the preparation of the catalysts. These carriers were then impregnated with solutions of chloroplatinic acid of suitable concentrations, dried, and activated, as described in Example 2. The pertinent properties of catalysts J and L are set forth in Table I.

*Example 5.*—The carrier for catalyst A was a commercial silica gel containing 0.05% alumina by weight. This carrier was impregnated with a solution of chloroplatinic acid, of suitable concentration, dried, and activated, as described in Example 2. The carriers for catalysts G, K, and M were produced by hydrothermally treating portions of this commercial silica gel for one hour to reduce the surface area, using the method set forth in Example 4. The conditions employed were:

| Carrier for catalyst | Temperature, °F. | Pressure, p. s. i. g. |
|---|---|---|
| G | 375 | 300 |
| K | 500 | 100 |
| M | 500 | 700 |

The thus-treated carriers were then calcined at 1000° F. for 16 hours and ground to pass a 14-mesh screen. The material retained on a 25-mesh screen was used for catalyst preparation. Portions of this material were impregnated with aqueous solutions of chloroplatinic acid of suitable concentrations, dried and activated in hydrogen, using the same methods described in Example 2. The pertinent properties of catalysts A, G, K, and M are set forth in Table I.

*Example 6.*—The carrier for catalyst F was prepared by mixing a solution comprising 463 parts by volume ethyl orthosilicate, 707 parts by volume "Formula 30" alcohol, and 161 parts by volume aqueous nitric acid solution (170 cc. 70.8% $HNO_3$ per liter) with an aqueous solution containing 130 parts by volume of 28% ammonium hydroxide in 1370 parts by volume of water, in a proportion such that the final pH of the resultant mixture was 6.9–7.1. Gelation was completed in about two minutes. The hydrogel thus formed was washed with water, until the washings showed no evidence of nitrate ions. Then, it was dried at 280° F. for 16 hours and calcined in air at 1000° F. for 8 hours. This carrier (substantially an alumina-free silica gel) was impregnated with an aqueous solution of chloroplatinic acid, dried and activated using the methods described in Example 2. The pertinent properties of catalyst F are set forth in Table I.

TABLE I

| Catalyst | Platinum, weight percent | Alumina, weight percent | Surface area, m.²/g. |
|---|---|---|---|
| A | 0.22 | 0.05 | 650 |
| B | 0.43 | 0.72 | 650 |
| C | 0.31 | 0.17 | 650 |
| D | 0.29 | 1.66 | 650 |
| E | 0.38 | 0.40 | 575 |
| F | 0.42 | >0.01 | 500 |
| G | 0.15 | 0.05 | 500 |
| H | 0.33 | 0.23 | 500 |
| I | 0.32 | 2.6 | 500 |
| J | 0.19 | 2.6 | 300 |
| K | 0.25 | 0.05 | 300 |
| L | 0.27 | 2.6 | 100 |
| M | 0.25 | 0.05 | 100 |

As is well known to those familiar with the art, the mixture of normal heptane with cyclohexane is a blend used to establish the performance of catalysts in reforming operations. As stated hereinbefore, the desiderata in such an operation are to effect isomerization and dehydrocyclization of the paraffinic hydrocarbons present in the charge, and isomerization and dehydrogenation of the cycloaliphatic hydrocarbons present in the charge, with a minimum amount of cracking. Accordingly, the amount of normal heptane in the charge that is converted (expressed as the mole percent of normal heptane charged) is a measure of the degrees of isomerization, of dehydrocyclization, and of cracking occurring, while the amounts of $C_7$-isomers (expressed as the mole percent of the normal heptane charged) and benzene (expressed as the mole percent of the cyclohexane charged) produced are direct measures of the isomerization and of the dehydrogenation achieved, respectively.

CATALYST EVALUATION USING PURE HYDROCARBON BLENDS

*Example 7.*—Each of the catalysts described in Table I was contacted with a mixture consisting of 50 mole percent normal heptane and 50 mole percent cyclohexane, in the presence of hydrogen. Each series of runs was carried out at a liquid hourly space velocity of 2, under a hydrogen pressure of 350 pounds per square inch gauge, and using a hydrogen-to-hydrocarbon molar ratio of 4. Runs were made under these conditions at various temperatures, between 750° F. and 950° F. At each temperature, the mole percent heptane isomer yield and the mole percent benzene yield were determined. The pertinent data are set forth in Table II.

TABLE II

| Catalyst | Alumina, weight percent | Surface area, m.²/g. | 750° F. | | 800° F. | | 850° F. | | 900° F. | | 950° F. | |
|---|---|---|---|---|---|---|---|---|---|---|---|---|
| | | | Mole percent C₇-isomer | Mole percent benzene | Mole percent C₇-isomer | Mole percent benzene | Mole percent C₇-isomer | Mole percent benzene | Mole percent C₇-isomer | Mole percent benzene | Mole percent C₇-isomer | Mole percent benzene |
| A | 0.05 | 650 | 5 | 35 | 18 | 67 | 33 | 82 | 39 | 90 | 20 | 95 |
| B | 0.72 | 650 | 24 | 19 | 45 | 36 | 53 | 57 | 35 | 81 | 8 | 95 |
| C | 1.17 | 650 | 35 | 12 | 54 | 28 | 49 | 53 | 26 | 74 | 6 | 88 |
| D | 1.66 | 650 | 48 | 8 | 55 | 23 | 41 | 48 | 17 | 76 | 4 | 90 |
| E | 0.40 | 575 | 9 | 29 | 22 | 52 | 40 | 69 | 46 | 82 | 21 | 90 |
| F | 0.01 | 500 | ------ | ------ | 43 | 76 | 1 | 94 | 6 | 98 | 9 | 100 |
| G | 0.05 | 500 | ------ | ------ | 32 | 3 | 67 | 17 | 85 | 25 | 99 | 23 | 96 |
| H | 0.23 | 500 | 4 | 38 | 9 | .59 | 19 | 74 | 31 | 86 | 26 | 95 |
| I | 2.6 | 500 | 51 | 7 | 38 | 21 | 12 | 45 | ------ | ------ | ------ | ------ |
| J | 2.6 | 300 | 18 | 24 | 36 | 47 | 49 | 68 | 38 | 84 | 11 | 94 |
| K | 0.05 | 300 | ------ | ------ | 45 | 1 | 77 | 2 | 92 | 3 | 98 | 5 | 100 |
| L | 2.6 | 100 | 9 | 35 | 23 | 54 | 39 | 71 | 43 | 85 | 22 | 94 |
| M | 0.05 | 100 | 2 | 61 | 9 | 74 | 24 | 85 | 35 | 93 | 32 | 99 |

*Note:* Mole percent yields are based upon mole percent component charged.

The curves shown in Figure 1 and designated by the letter E are based upon the data obtained from the runs described in Example 7, in which catalyst E was used. These curves show the relationship between the temperature and the mole percent heptane isomer yield, and between the temperature and the mole percent benzene yield, when using catalyst E. It will be noted that the maximum yield of heptane isomers was about 48 mole percent, at a temperature of about 890° F. At this temperature, the benzene yield was about 79 mole percent.

Curves F are set forth in Figure 1 for purposes of comparison. These curves are based upon the data obtained for the runs in which catalyst F was used. This catalyst was prepared from a carrier that was substantially pure silica. It will be noted that, in this case, the heptane isomer yield is very low, even though the benzene yield was high.

In a similar manner, using the data set forth in Table II, sets of curves (not shown) were drawn for the other catalysts. In each case, the maximum heptane isomer yield and the corresponding benzene yield effected were established. The data thus-obtained were the basis for the curves shown in Figure 2.

The curves presented in Figure 2, show graphically the relationship between the maximum heptane isomer yield and the alumina content, and between the benzene yield at maximum heptane isomer yield and the alumina content, when using platinum catalysts that include carriers comprising silica cogelled with alumina and having surface areas of 100, 300, 500 and 650 square meters per gram, respectively. Curves 1 and 1' show graphically the relationship between the alumina content and the maximum heptane isomer yield, and the alumina content and the benzene yield at maximum isomer yield, respectively, for the catalysts having a surface area of 100 square meters per gram. Curves 2 and 2' show graphically the same relationship for the catalysts having a surface area of 300 square meters per gram. Curves 3 and 3' show graphically the same relationship for the catalysts having a surface area of 500 square meters per gram and curves 4 and 4' show graphically the same relationship for catalysts having a surface area of 650 square meters per gram.

The curves set forth in Figure 2, were used to obtain the curves shown in Figure 3. In each pair of curves (1 and 1', 2 and 2', 3 and 3', 4 and 4') in Figure 2, the point was selected on the isomer yield curve at which the isomer yield was highest and, yet, the benzene yield was also high, and a perpendicular was drawn from that point to the abscissa. The value of the abscissa thus obtained establishes the alumina content of the platinum catalyst having the surface area represented by the pair of curves and with which maximum reforming is effected. Accordingly, the points shown in Figure 2 that establish this alumina content for catalysts affording maximum reforming are points $P_1$, $P_2$, $P_3$, and $P_4$ on curves 1, 2, 3, and 4, respectively. The alumina contents derived from these points were used to prepare the curve XY presented in Figure 3. Curve XY, therefore, defines the relationship between the alumina content and the surface area of platinum or palladium catalysts of this invention having cogelled supports, with which maximum reforming is effected.

In order to effect good reforming, it has been found that two factors are predominantly controlling, namely (1) the benzene production should be at least about 60 mole percent and (2) the maximum isomer yield should be at least about 40 mole percent. Accordingly, referring to curves 1 and 1' (Fig. 2), it will be noted that, for a catalyst having a surface area of 100 square meters per gram, that when the alumina content is increased to about 7 percent, the benzene yield commences to fall below about 60 mole percent. This concentration, therefore, represents the maximum permissible alumina content for a catalyst having a surface area of 100 square meters per gram. Likewise, at about 2.2 percent alumina content, the isomer yield obtained with this catalyst falls below about 40 mole percent, even though the benzene yield is high. Accordingly, this concentration of 2.2 percent represents the lower limit of the range of permissible alumina content for a catalyst having a surface area of 100 square meters per gram. In the same manner, points were obtained from curves 2 and 2', 3 and 3', and 4 and 4', to determine the maximum and the minimum alumina contents in each case. These points were used to define curves AB and CD in Figure 3.

Accordingly, curve AB in Figure 3, defines the relationship between the surface area and the maximum alumina content of a catalyst comprising platinum or palladium on silica cogelled with alumina to effect reforming in accordance with this invention. Curve CD, on the other hand, defines the relationship between the surface area and the minimum alumina content. The area delineated by the points A, B, C and D, therefore, represents the area within which a point determined by the alumina content and the surface area of a catalyst comprising platinum or palladium on silica cogelled with alumina must fall in order to effect good reforming. Any points (e. g., a surface area of 200 square meters per gram and an alumina content of 6 weight percent), falling outside the delineated area define catalysts which are relatively poor for reforming operations. Accordingly, such catalysts do not come within the scope of this invention. The catalysts comprising platinum or palladium supported on silica cogelled with alumina and having surface areas of between 100 square meters per gram and 650 square meters per gram, therefore, must contain alumina in amounts of between about 0.05 percent, by weight, and about 7.0 percent, by weight, provided, of course, that the amount is correlated with the surface area to define points falling within the area delineated by A, B, C, D in Figure 3. The especially preferred range of alumina content varies between about 0.13 percent, by weight, and about 3.8 percent, by weight, again correlated with the surface area to define a point falling on curve XY in Figure 3.

CATALYSTS PREPARED WITH CARRIERS COMPRISING COGELLED SILICA AND ALUMINA, ACID-LEACHED, AND IMPREGNATED WITH ALUMINA

Catalyst preparation

*Example 8.*—The carrier for catalyst AA was prepared from a commercial, minus 14-plus 25-mesh silica gel that contained about 0.05% alumina by weight cogelled therewith. This silica gel was calcined in air for about 17 hours at 1000° F. The calcined gel was covered with a 1.5 N aqueous solution of sulfuric acid and heated, at reflux temperature (215° F.), for about 2 hours. This mixture was then allowed to stand for about 17 hours, at thet end of which time the liquid phase was removed. The acid-leached silica gel was then washed with water by slowly flowing water (in an amount equal to about 15 times the volume of the silica gel) through a bed of the silica gel, for about 36 hours until the final washings contained no trace of sulfate ions. The washed, acid-leached silica gel was dried in air at about 280° F. for 6 hours, and calcined in air for about 16 hours at about 1000° F. The carrier thus prepared contained about 0.03% alumina by weight. This carrier was impregnated with an aqueous solution of chloroplatinic acid, dried, and activated in hydrogen, using the procedures set forth in Example 2. The pertinent properties of catalyst AA are set forth in Table III.

*Example 9.*—A portion of the acid-leached silica gel carrier, prepared as described in Example 8, was covered with an aqueous, 0.037 molar solution of aluminum nitrate and allowed to stand with intermittent stirring, for about one hour, at room temperature (about 65° F.). The excess solution was removed by centrifuging. The thus-impregnated gel was then dried in air at about 228° F. for about 2 hours, and then calcined in air, for two hours at about 1000° F. The carrier thus prepared was impregnated with a chloroplatinic acid solution of suitable concentration, dried, and activated in hydrogen, using the methods described in Example 2. The pertinent properties of the catalyst thus prepared (catalyst BB) are set forth in Table III.

*Example 10.*—The carriers for catalysts CC and DD were prepared by impregnating portions of the acid-leached silica gel carrier described in Example 8 with aluminum nitrate solutions of sufficient concentrations to produce the desired alumina content in the finished catalysts, using the method set forth in Example 9. These impregnated carriers were dried and calcined, as described in Example 9, and then impregnated with chloroplatinic acid solutions of suitable concentrations, dried, and activated in hydrogen, using the procedures described in Example 2. The pertinent properties of catalysts CC and DD are set forth in Table III.

*Example 11.*—In order to prepare the carriers for catalysts EE, FF, GG, HH, and II, the surface area of portions of the carrier used in the preparation of catalyst AA (Example 8) was reduced by a hydrothermal treatment for one hour, using the procedure set forth in Example 4. The temperature and pressure conditions were as follows:

| Carrier for catalyst | Temperature, ° F. | Pressure, p. s. i. g. |
|---|---|---|
| EE, FF | 400 | 100 |
| GG, HH, II | 500 | 100 |

After drying and calcining, these carriers were impregnated with aluminum nitrate solutions of suitable concentrations to obtain the desired final alumina content, using the procedures described in Example 9. These impregnated carriers were dried and calcined, as described in Example 9, and then impregnated with chloroplatinic acid solutions of suitable concentrations, dried, and activated in hydrogen, using the procedures described in Example 2. The pertinent properties of catalysts EE, FF, GG, HH, and II are set forth in Table III.

TABLE III

| Catalyst | Platinum, weight percent | Alumina, weight percent | Surface area, $M^2/g$. |
|---|---|---|---|
| AA | 0.15 | 0.03 | 570 |
| BB | 0.42 | 0.07 | 570 |
| CC | 0.42 | 0.09 | 570 |
| DD | 0.32 | 0.17 | 570 |
| EE | 0.30 | 0.11 | 435 |
| FF | 0.28 | 0.28 | 435 |
| GG | 0.28 | 0.23 | 215 |
| HH | 0.29 | 0.37 | 215 |
| II | 0.33 | 0.45 | 215 |

CATALYST EVALUATION USING PURE HYDROCARBON BLENDS

*Example 12.*—Each of the catalysts set forth in Table III was subjected to a series of runs, using the blend of normal heptane and cyclohexane, and the procedure and conditions described in Example 7. The heptane isomer yields and the benzene yields obtained, using each catalyst at several temperatures between 750° F. and 950° F. are set forth in Table IV.

TABLE IV

| Catalyst | Alumina, weight percent | Surface area, $M^2/g$. | 750° F. | | 800° F. | | 850° F. | | 900° F. | | 950° F. | |
|---|---|---|---|---|---|---|---|---|---|---|---|---|
| | | | Mole percent $C_7$-Isomer | Mole percent benzene | Mole percent $C_7$-Isomer | Mole percent benzene | Mole percent $C_7$-Isomer | Mole percent benzene | Mole percent $C_7$-Isomer | Mole percent benzene | Mole percent $C_7$-Isomer | Mole percent benzene |
| AA | 0.03 | 570 | 4 | 38 | 12 | 66 | 26 | 78 | 38 | 84 | 26 | 89 |
| BB | 0.07 | 570 | 11 | 29 | 29 | 50 | 46 | 71 | 38 | 86 | 21 | 91 |
| CC | 0.09 | 570 | 19 | 27 | 36 | 47 | 48 | 68 | 35 | 84 | 13 | 89 |
| DD | 0.17 | 570 | 26 | 16 | 42 | 35 | 51 | 61 | 36 | 79 | | 88 |
| EE | 0.11 | 435 | 14 | 30 | 31 | 49 | 45 | 69 | 36 | 83 | 6 | 89 |
| FF | 0.28 | 435 | 23 | 21 | 38 | 39 | 50 | 62 | 28 | 79 | | 86 |
| GG | 0.23 | 215 | 16 | 26 | 33 | 47 | 45 | 67 | 38 | 819 | 24 | 88 |
| HH | 0.37 | 215 | 16 | 23 | 33 | 45 | 45 | 65 | 40 | 79 | 29 | 85 |
| II | 0.45 | 215 | 23 | 19 | 38 | 42 | 48 | 63 | 35 | 77 | 17 | 83 |

The curves shown in Figure 1 and designated by the letters DD are based upon the data obtained from the runs using catalyst DD as set forth in Table IV. These curves show graphically the relationship between the temperature and the mole percent heptane isomer yield, and between the temperature and the mole percent benzene yield, when using catalyst DD. Similar curves (not shown) were drawn, using the data obtained from the runs involving the other catalysts (AA through II), as shown in Table IV. The maximum heptane isomer yield for catalyst DD was about 52 mole percent, at a temperature of about 840° F. The benzene yield at this temperature was about 56 mole percent. These values, and similar values obtained from the curves drawn from the data obtained for the other catalysts (Table IV) are basis for the curves presented in Figure 4.

The curves presented in Figure 4, therefore, show graphically the relationship between the maximum yield of heptane isomers and the alumina content and between the yield of benzene at maximum isomer yield and the alumina content of platinum catalysts having supports, comprising silica cogelled with alumina, acid-treated, and then impregnated with alumina, and having various surface areas. Curves 5 and 5' show graphically the relationship between the alumina content and the maximum heptane yield and between the alumina content and the benzene yield at maximum isomer yield, respectively, for catalysts having a surface area of 215 square meters per gram. Likewise, curves 6 and 6' show graphically this relationship for catalysts having a surface area of 435 square meters per gram, and curves 7 and 7' show graphically this relationship for catalysts having a surface area of 570 square meters per gram.

The curves presented in Figure 5 were derived from the curves set forth in Figure 4, in the same manner as the curves in Figure 3 were derived from the curves in Figure 2. Accordingly, in Figure 4, $P_5$, $P_6$, $P_7$ represent the points on the maximum isomer curves 5, 6, and 7, respectively, that indicate the alumina content in the catalysts having carriers comprising silica cogelled with alumina, acid-treated, and then impregnated with alumina and which have the specified surface areas, with which maximum reforming is effected. The values for alumina contents thus obtained were used to prepare curve RS presented in Figure 5. Curve RS, therefore, shows graphically the relationship between the alumina content and the surface area of platinum or palladium catalysts of this invention having supports comprising silica cogelled with alumina, acid-leached, and then impregnated with alumina, with which maximum reforming is effected.

The maximum and the minimum alumina concentrations of platinum or palladium catalysts having carriers of this type were derived in the same manner employed in connection with curves AB and CD, respectively, in Figure 3. The benzene yield commences to fall below 60 mole percent when the alumina content of the 215 square meter per gram platinum catalyst (curve 5') is about 0.55 percent. This is the maximum alumina content therefore, of a platinum or palladium catalyst having a surface area of 215 square meters per gram, having a carrier comprising silica cogelled with alumina, acid-treated, and further impregnated with alumina, with which good reforming can be effected in accordance with this invention. At an alumina content of about 0.14 percent (curve 5), the maximum isomer yield obtained with this 215 square meter per gram catalyst commences to fall below 40 mole percent. Therefore, this is the minimum alumina content for a platinum or palladium catalyst of this surface area having a carrier comprising silica cogelled with alumina, acid-treated, and then impregnated with alumina, with which good reforming is effected, in accordance with this invention.

Other points of maximum and minimum alumina contents were similarly obtained for this series of catalysts, from curves 6 and 6', 7 and 7'. These points were used to prepare the maximum alumina curve EF and the minimum alumina curve GH in Figure 5. The area delineated by the points E, F, G, and H, therefore, represents the area within which a point determined by the alumina content and the surface area of a platinum or palladium catalyst must fall, in order to effect good reforming, when the carrier comprises silica cogelled with alumina, acid-treated and further impregnated with alumina. The catalysts having surface areas of between about 100 square meters per gram and about 650 square meters per gram and having carriers comprising silica cogelled with alumina, acid-treated and further impregnated with alumina, therefore, must contain alumina in amounts of between about 0.025 percent, by weight, and about 1.0 percent, by weight, provided, of course, that the amount is correlated with the surface area to define points falling within the area delineated by E, F, G, and H in Figure 5. The especially preferred range of alumina content for a catalyst having such a carrier varies between about 0.05 percent, by weight, and about 0.5 percent, by weight, again correlated with the surface area to define a point falling on curve RS in Figure 5.

The silica bases, which were cogelled with alumina, acid-leached and then impregnated with alumina to form the carriers of the catalysts which were used to obtain the data represented in Figures 4 and 5, were prepared from commercial silica gels having about 0.05 percent alumina cogelled therewith. After acid-leaching, the silica gels still contained small amounts (0.025–0.05%) of alumina. It was found, however, that these small amounts of residual alumina did not appear to contribute substantially to the activity of the final catalysts. In other words, from the standpoint of the present invention, these acid-leached silica bases were substantially equivalent to pure silica. This has been found to be inert as a base for a good platinum or palladium reforming catalyst, unless it is impregnated with small amounts of alumina. Accordingly, the catalysts having carriers comprising acid-leached, cogelled silica and alumina, further impregnated with various amounts of alumina, as defined in conjunction with Figure 5, are substantially equivalent to the catalysts having carriers comprising pure silica impregnated with the same amounts of alumina. Therefore, curve RS and the area delineated by the points E, F, G, and H in Figure 5 also indicate the relationship between the alumina content and the surface area that is necessary in catalysts having surface areas of between about 100 square meters per gram and about 650 square meters per gram, and which comprise platinum or palladium deposited upon carriers produced by impregnating substantially pure silica with alumina, to effect good reforming in accordance with this invention. In such catalysts, therefore, the alumina content will vary between about 0.025 percent, by weight, and about 1.0 percent, by weight, provided, of course, that the amount is correlated with the surface area to define points falling within the area delineated by E, F, G, and H in Figure 5. The preferred range of alumina content will be between about 0.05 percent, by weight, and about 0.5 percent, by weight, correlated with the surface area to define points falling on curve RS in Figure 5.

CATALYSTS PREPARED WITH CARRIERS COMPRISING SILICA COGELLED WITH ALUMINA AND FURTHER IMPREGNATED WITH ALUMINA

*Catalyst Preparation*

*Example 13.*—Portions of a commercial silica gel containing about 0.05% alumina, by weight, cogelled therewith, were impregnated with aqueous solutions of aluminum nitrate (of suitable normalities to produce the desired alumina content in the finished catalyst), dried, and calcined, using the procedures described in Example 9. The carriers thus produced were impregnated with aqueous solutions of chloroplatinic acid of suitable concentrations, dried, and activated in hydrogen, using the methods set forth in Example 2. The pertinent properties of these catalysts (AAA and BBB) are set forth in Table V.

*Example 14.*—A commercial silica gel containing about 0.05% alumina cogelled therewith was hydrothermally treated for one hour, at about 500° F., and under a pressure of about 100 pounds per square inch gauge, dried and calcined, using the procedures set forth in Example 4. Then, portions of the thus-treated gel were impregnated with aqueous solutions of aluminum nitrate (of suitable concentrations to produce the desired final alumina content), dried, and calcined, by the methods described in Example 9. Each of the alumina-impregnated carriers thus prepared was impregnated with an aqueous solution of chloroplatinic acid of suitable concentration, dried, and activated in hydrogen, using the methods described in Example 2. The pertinent properties of these catalysts (CCC, DDD, and EEE) are set forth in Table V.

*Example 15.*—The commercial silica gel containing about 0.05% alumina by weight cogelled therewith was hydrothermally treated for one hour, under a pressure of about 250 pounds per square inch gauge, and at about 500° F., dried, and calcined, using the methods described in Example 4. The carrier thus produced was impregnated with an aqueous solution of chloroplatinic acid of suitable concentration, dried, and activated in hydrogen, using the procedures set forth in Example 2. The pertinent properties of this catalyst (FFF) are set forth in Table V.

*Example 16.*—Portions of the carrier used to prepare catalyst FFF (Example 15) were impregnated with aqueous solutions of aluminum nitrate (of suitable concentrations to produce the desired final alumina content), dried, and calcined, using the procedures set forth in Example 9. The thus-impregnated carriers were impregnated with aqueous solutions of chloroplatinic acid of suitable concentrations, dried, and activated in hydrogen, using the methods described in Example 2. The pertinent properties of these catalysts (GGG, HHH, and III) are set forth in Table V.

*Example 17.*—Portions of the commercial silica gel containing about 0.05% alumina cogelled therewith were hydrothermally treated for one hour, using the procedures described in Example 4, and under the following conditions:

| Carrier for catalyst | Temperature, °F. | Pressure, p. s. i. g. |
| --- | --- | --- |
| JJJ | 500 | 700 |
| KKK | 600 | 900 |
| LLL | 500 | 700 |
| MMM | 600 | 900 |
| NNN | 500 | 700 |
| OOO | 500 | 700 |

Each portion was then impregnated with an aqueous solution of aluminum nitrate (having a concentration sufficient to produce the desired final alumina content), dried, and calcined, using the methods set forth in Example 9. Each alumina-impregnated carrier was then impregnated with an aqueous solution of chloroplatinic acid of suitable concentration, dried, and activated in hydrogen, using the procedures described in Example 2. The pertinent properties of these catalysts (JJJ, KKK, LLL, MMM, NNN, and OOO) are set forth in Table V.

| Catalyst | Platinum, weight percent | Alumina, weight percent | Surface area, M²/g. |
| --- | --- | --- | --- |
| AAA | 0.35 | 0.10 | 650 |
| BBB | 0.17 | 0.25 | 650 |
| CCC | 0.19 | 0.35 | 520 |
| DDD | 0.23 | 1.3 | 520 |
| EEE | 0.33 | 2.2 | 520 |
| FFF | 0.16 | 0.05 | 273 |
| GGG | 0.13 | 0.58 | 273 |
| HHH | 0.21 | 1.4 | 273 |
| III | 0.23 | 3.0 | 273 |
| JJJ | 0.27 | 0.35 | 105 |
| KKK | 0.28 | 1.4 | 105 |
| LLL | 0.22 | 2.2 | 105 |
| MMM | 0.35 | 2.8 | 105 |
| NNN | 0.30 | 3.1 | 105 |
| OOO | 0.28 | 4.0 | 105 |

CATALYST EVALUATION USING PURE HYDROCARBON BLENDS

*Example 18.*—Each of the catalysts set forth in Table V and also catalysts A, G, and M (Table I) was subjected to a series of runs, using the blend of heptane and cyclohexane and the procedure and conditions described in Example 7. The heptane isomer yields and the benzene yields obtained using each catalyst, at several temperatures, are set forth in Table VI.

TABLE VI

| Catalyst | Alumina, weight percent | Surface area, M²/g. | 750° F. | | 800° F. | | 850° F. | | 900° F. | | 950° F. | |
| --- | --- | --- | --- | --- | --- | --- | --- | --- | --- | --- | --- | --- |
| | | | Mole percent C₇-Isomer | Mole percent benzene | Mole percent C₇-Isomer | Mole percent benzene | Mole percent C₇-Isomer | Mole percent benzene | Mole percent C₇-Isomer | Mole percent benzene | Mole percent C₇-Isomer | Mole percent benzene |
| A | 0.05 | 650 | 5 | 35 | 18 | 67 | 33 | 82 | 39 | 90 | 26 | 95 |
| AAA | 0.10 | 650 | 13 | 32 | 30 | 49 | 45 | 67 | 37 | 82 | 17 | 90 |
| BBB | 0.25 | 650 | 35 | 14 | 51 | 33 | 45 | 59 | 24 | 84 | 4 | 96 |
| G | 0.05 | 500 | 0 | 32 | 3 | 67 | 17 | 85 | 25 | 92 | 23 | 96 |
| CCC | 0.35 | 520 | 26 | 16 | 43 | 37 | 46 | 61 | 33 | 82 | 13 | 93 |
| DDD | 1.3 | 520 | 46 | 8 | 48 | 27 | 36 | 55 | 15 | 83 | | |
| EEE | 2.2 | 520 | 51 | 8 | 43 | 24 | 29 | 52 | 10 | 83 | | |
| FFF | 0.05 | 273 | 0 | 50 | 0 | 76 | 5 | 86 | 11 | 91 | 14 | 94 |
| GGG | 0.58 | 273 | 22 | 22 | 40 | 40 | 52 | 63 | 39 | 84 | 20 | 93 |
| HHH | 1.4 | 273 | 40 | 9 | 50 | 26 | 51 | 51 | 37 | 72 | 15 | 87 |
| III | 3.0 | 273 | 53 | 8 | 51 | 26 | 39 | 57 | 18 | 81 | | |
| M | 0.05 | 100 | 0 | 49 | 0 | 80 | 2 | 91 | 4 | 94 | 6 | 100 |
| JJJ | 0.35 | 105 | 2 | 35 | 12 | 70 | 27 | 81 | 31 | 90 | 22 | 94 |
| KKK | 1.4 | 105 | 4 | 23 | 30 | 45 | 44 | 67 | 40 | 85 | 19 | 92 |
| LLL | 2.2 | 105 | 33 | 17 | 47 | 30 | 52 | 56 | 32 | 80 | 10 | 89 |
| MMM | 2.8 | 105 | 28 | 15 | 50 | 34 | 52 | 61 | 32 | 79 | 5 | 90 |
| NNN | 3.1 | 105 | 41 | 11 | 53 | 28 | 49 | 55 | 28 | 84 | 8 | 96 |
| OOO | 4.0 | 105 | 47 | 11 | 53 | 30 | 45 | 62 | 22 | 76 | | |

The curves shown in Figure 1 and designated by the letter AAA are based upon the data obtained from the runs described in Example 18 in which catalyst AAA was used. These curves show graphically the relationship between the temperature and the mole per cent heptane isomer yield, and between the temperature and the mole per cent benzene yield. Similar curves (not shown) were drawn using the data obtained from the runs in which the other catalysts (BBB through OOO, A, G, and M) were used. It will be noted (Fig. 1) that the maximum heptane isomer yield obtained when using catalyst AAA was about 47 mole percent, at a temperature of about 860° F. The benzene yield at this temperature was about 70 mole percent. These values and the values obtained from similar curves based on the data (Tables II and VI) obtained useing the other catalysts furnished points for the preparation of the curves presented in Figure 6.

Accordingly, in Figure 6, curves 8 and 8' show graphically the relationship between the total alumina content and the mole per cent maximum isomer yield and between the total alumina content and the mole percent benzene yield at maximum isomer yield, respectively, for the platinum catalysts having a surface area of 105 square meters per gram and that include carriers comprising silica cogelled with 0.05 percent alumina and impregnated with various amounts of alumina. Curves 9 and 9′ show graphically this relationship for similar catalysts having surface areas of 273 square meters per gram. Curves 10 and 10′ and curves 11 and 11′, respectively, show graphically this relationship for such catalysts having surface areas of 520 square meters per gram and of 650 square meters per gram, respectively. Points $P_8$, $P_9$, $P_{10}$, and $P_{11}$, which were derived in a manner similar to that described hereinbefore in conjunction with Figures 2 and 4, indicate the alumina content of these platinum catalysts having surface areas of 105, 273, 520, and 650 square meters per gram, respectively, with which maximum reforming is effected. The curves presented in Figure 7 were derived from the curves shown in Figure 6, in a manner similar to that by which the curves of Figures 3 and 5 were derived from the curves of Figures 2 and 4. Therefore, in Figure 7, curve TU shows graphically the relationship between the alumina content and the surface area of platinum or palladium reforming catalysts having supports comprising silica cogelled with 0.05 percent alumina and impregnated with additional amounts of alumina, with which maximum reforming is effected. The area delineated by the points K, L, M, and N, represents the area within which a point determined by the alumina content and the surface area of a catalyst comprising silica cogelled with 0.05 percent alumina and impregnated with additional amounts of alumina must fall, in order to obtain good reforming. Hence, in catalysts of this type having a surface area of between about 100 square meters per gram and about 650 square meters per gram, the range of variation of the total alumina content (cogelled and impregnated with the silica in the support) will vary between about 0.05 percent, by weight, and about 1.9 percent, by weight, provided that the amount is correlated with the surface area to define points falling within the area delineated by K, L, M, N, in Figure 7. The especially preferred range of alumina content for these catalysts varies between about 0.11 percent, by weight, and about 0.94 percent, by weight, correlated with the surface area to define points falling on curve TU in Figure 7.

The area delineated in Figure 8 is derived from Figures 3 and 5. Curve AB shows graphically the relationship between the maximum alumina content and the surface area of platinum or palladium reforming catalysts of this invention having carriers comprising silica cogelled with alumina. Curve GH shows graphically the relationship between the minimum alumina content and the surface area of platinum or palladium reforming catalysts of this invention having carriers comprising silica impregnated with alumina. Therefore, the area delineated by points A, B, G, and H defines the overall limits of the range of variation of the alumina content that must be correlated with the surface area, in order to produce good platinum or palladium reforming catalysts in accordance with this invention, whether the carriers thereof are produced by impregnation, by cogelation (including ion exchange) or by cogelation and impregnation.

PROCESS VARIABLES

The temperature at which isomerization occurs is not affected by variations in pressure. On the other hand, the temperatures of aromatization vary directly with pressure. It will be appreciated, therefore, that under high pressure conditions, the temperature of aromatization may be much higher than the temperature at which maximum isomerization occurs. In such cases, it may be desirable to decrease the alumina content of the carrier slightly below the values shown in Figures 3, 5, 7 and 8. On the other hand, lowering the pressure may permit the use of carriers containing slightly more alumina than is indicated in these figures. Variations in the liquid hourly space velocity will also affect the ranges of alumina content somewhat. Under the reforming conditions suitable for the catalysts of this invention, however, there will be little variation from the above-indicated ranges of alumina content that must be correlated with the surface area.

In accordance with the present invention, after the catalyst has been in service for a substantial period of time, reactivation may be necessary. This can be accomplished readily by contacting the catalyst with air or other oxygen-containing gases at elevated temperatures in order to burn the carbonaceous deposits from the catalyst. For example, regeneration can be effected at temperatures of between about 900° F. and about 950° F., commencing with a gas of low-oxygen-content and gradually increasing the oxygen concentration throughout the regeneration period which may last from about 6 hours to about 24 hours. It is important to maintain the regeneration temperature below about 1000° F., as higher temperatures tend to impair the catalyst activity. The regenerated catalyst is then treated with hydrogen at about 1000° F. for about 2–10 hours to complete the reactivation.

Reforming in accordance with this invention is carried out at temperatures varying between about 700° F. and about 1000° F. It is preferred, however, to operate at temperatures varying between about 725° F. and about 975° F. The hydrogen pressure will vary between about 100 pounds per square inch gauge and about 1000 pounds per square inch gauge, preferably, between about 350 and about 700 pounds per square inch gauge. The liquid hourly space velocity, i. e., the liquid volume of hydrocarbon charged per hour per volume of catalyst, can vary between about 0.1 and 10, preferably, between about 0.5 and 4. Generally, the molar ratio of hydrogen to hydrocarbon charge will be between about 1 and about 20, preferably, between about 4 and about 12.

The process of this invention can be carried out in any equipment suitable for conducting catalytic operations. The process can be operated batch-wise. It is preferable, and most feasible, however, to use a continuous operation utilizing a fixed bed of catalyst. It can be operated, also, if desired using a moving bed of catalyst, wherein the hydrocarbon flow can be concurrent or countercurrent to the catalyst flow. A fluid type of operation can be used, wherein the catalyst is carried in suspension in the hydrocarbon charge, or fluidized with hydrogen, and circulated without regeneration. Another embodiment of fluid operation applicable herein is the use of a "static" bed of catalyst fluidized by the hydrogen gas and the gaseous hydrocarbon charge.

Hydrocarbon charge stocks suitable for use in the process of this invention comprise hydrocarbon fractions that boil within the range varying between about 60° F. and about 450° F. This includes straight-run or cracked naphthas, gasoline and kerosine. The gasoline fraction can be a full boiling range gasoline having an initial boiling point of about 60° F. and an end-boiling point of about 425° F. It is usually preferred, however, to use a selected fraction boiling within this range, such as naphtha, which will have an initial boiling point of between about 150° F. and about 250° F., and an end-boiling point of about 350° F. and about 425° F., and which boils substantially continuously between these points. The reforming process of this invention does not appear to be adversely affected by the presence of sulfur or of olefins in the charge stock. Accordingly, this process is also applicable to the so-called "sour" reforming charge stocks, which, as is well known, contain upwards of about 0.05 weight percent sulfur, up to as much as about 0.4 weight percent sulfur or more. The reforming charge stock can also contain olefins in amounts varying between about 1 volume percent and about 30 volume percent, and higher.

NAPHTHA REFORMING

The following examples are for the purpose of illustrating the process of this invention, and of demonstrating the effectiveness thereof. It must be strictly understood, however, that this invention is not to be limited to the particular catalysts, charge stocks or operating conditions set forth in the examples or to the operations and manipulations described therein. A variety of other catalysts, charge stocks and conditions, all as described hereinbefore, can be used, as those skilled in the art will readily appreciate.

*Example 19.*—A typical petroleum naphtha was subjected to a series of reforming runs in the presence of hydrogen, using catalysts A, E, L and F. This naphtha was distilled from a Mid-Continent crude and has the following properties:

ASTM distillation:
| | |
|---|---|
| I. B. P. | °F__ 240 |
| 50% | °F__ 278 |
| E. P. | °F__ 361 |
| A. P. I. gravity (60° F.) | 56.2 |
| Octane No. (F-1 clear) | 37 |
| Octane No. (F-1+3 cc. TEL) | 63.5 |
| Sulfur, wt. percent | 0.03 |

Each of the reforming operations was carried out at a liquid hourly space velocity of 3, under a hydrogen pressure of about 500 pounds per square inch gauge, and using a hydrogen-to-hydrocarbon molar ratio of 10. The runs were carried out at several temperatures. The yield of 10 pound RVP gasoline and its leaded octane number (F-1+3 cc. TEL) were noted at each operating temperature. These data are presented in Table VII.

The curves shown in Figure 9 are based upon the data presented in Table VII. Curve 20 shows graphically the relationship between the yield of 10# RVP gasoline and the octane number (F-1+3 cc. TEL) thereof when reforming the Mid-Continent naphtha, in the presence of catalyst L. (This catalyst includes a carrier comprising silica cogelled with an amount of alumina that approaches a minimum for a catalyst having a low surface area.) Curve 21 presents the same relationship for runs using catalyst A. (This catalyst includes a carrier comprising silica cogelled with an amount of alumina that is a minimum for a high surface area catalyst.) And curve 22 shows the same relationship for runs using catalyst E. (This catalyst includes a carrier comprising silica cogelled with an amount of alumina that is optimum for a catalyst having a high surface area.) Curve 23 is shown for comparison purposes. This curve shows the relationship between the yield of 10# RVP gasoline and the octane number (F-1+3 cc. TEL) in reforming operations using catalyst F. (This catalyst comprises platinum deposited upon a substantially alumina-free silica gel.) From curves 20, 21 and 22, it will be noted that good reforming is achieved in the presence of typical catalysts of this invention. It will be appreciated, however, that better yields of high octane gasoline are obtained when using a preferred catalyst within the scope of this invention (curve 22), than those obtained using other catalysts that are nevertheless encompassed by the specifications set forth hereinbefore (curves 20 and 21). It will also be apparent that good reforming cannot be achieved in the presence of catalysts not encompassed by the specifications set forth hereinbefore (curve 23).

Excellent reforming can be achieved with the catalysts of this invention, even if the charge stock contains substantial amounts of olefins or relatively large amounts of sulfur, or both. This is illustrated by the runs described in Example 20.

*Example 20.*—Two charge stocks were subjected to the reforming process of this invention. One was a blended naphtha containing equal parts of a Mid-Continent naphtha, a pressure distillate fraction, and a straight-run naphtha distilled from a sour West Texas crude. The other was the straight-run sour West Texas naphtha. They had the following properties:

| | Blended naphtha | West Texas sour |
|---|---|---|
| A. P. I. gravity | 51.7 | 50.7 |
| Paraffins, weight percent | 39.0 | 39.0 |
| Naphthenes, weight percent | 36.0 | 41.0 |
| Aromatics, weight percent | 16.0 | 20.0 |
| Olefins, weight percent | 9.0 | |
| Sulfur, weight percent | 0.35 | 0.26 |
| ASTM distillation: | | |
| I. B. P. °F | 216 | 226 |
| 50% °F | 282 | 286 |
| E. P. °F | 386 | 393 |
| Octane No. (F-1 clear) | 55.5 | 48.9 |
| Octane No. (F-1+3 cc. TEL) | 68.4 | 64.8 |

Each of these naphthas was subjected to reforming in accordance with the process of this invention, at several temperatures, using catalyst E. The liquid hourly space velocity used was 2, the hydrogen-to-hydrocarbon molar ratio was 10, and the hydrogen pressure was 500 pounds per square inch gauge. In each run, the volume percent yield of 10# RVP gasoline and the octane number (F-1+3 cc. TEL) were noted for each operating temperature. These data are set forth in Table VIII.

TABLE VII

| Catalyst | 850° F. | | 875° F. | | 900° F. | | 925° F. | | 950° F. | | 975° F. | |
|---|---|---|---|---|---|---|---|---|---|---|---|---|
| | Yield, vol. percent | Leaded O. N. | Yield, vol. percent | Leaded O. N. | Yield, vol. percent | Leaded O. N. | Yield, vol. percent | Leaded O. N. | Yield, vol. percent | Leaded O. N. | Yield, vol. percent | Leaded O. N. |
| A | | | 98 | 93 | 93 | 95.5 | 87 | 97.5 | 81.5 | 100 | | |
| E | | | 100 | 93 | 94 | 96 | 88 | 99 | 84 | 102 | | |
| L | 99 | 92.5 | 96 | 94 | 92.5 | 96.5 | 89 | 97.5 | 86 | 101 | | |
| F | | | 116.5 | 78.5 | 115 | 80 | 114 | 80.5 | 113 | 85.5 | 111.5 | 86 |

TABLE VIII

| Charge | 850° F. | | 875° F. | | 900° F. | | 925° F. | | 950° F. | |
|---|---|---|---|---|---|---|---|---|---|---|
| | Yield, vol. percent | Leaded O. N. | Yield, vol. percent | Leaded O. N. | Yield, vol. percent | Leaded O. N. | Yield, vol. percent | Leaded O. N. | Yield, vol. percent | Leaded O. N. |
| Blended naphtha | | | 106.5 | 90.5 | 102 | 94 | 97 | 97 | 90 | 99.5 |
| Sour West Texas | 107.5 | 91 | 104.5 | 94 | 101 | 96.5 | 96.5 | 98.5 | 90 | 100 |

The curves shown in Figure 10 are based upon the data set forth in Table VIII. Curve 25 shows graphically the relationship between the yield of 10# RVP gasoline and the octane number (F-1+3 cc. TEL) obtained with the sour West Texas naphtha. Curve 26 shows graphically the same relationship obtained with the blended naphtha. It will be apparent from these curves that excellent reforming of high sulfur-containing naphthas (curves 25 and 26) and of naphthas containing both olefins and sulfur (curve 26) can be obtained in accordance with this invention.

After the catalyst has been in use for several days, it still produces high-octane gasoline in excellent yields. This will be apparent from the runs described in Example 21, using naphthas obtained from various sources.

*Example 21.*—The charge stocks used in these runs were distilled from several crude oils, namely, Guico (Venezuelan), Tibu (Middle East), and Redwater (U. S.). They had the following properties:

| | Guico | Tibu | Redwater |
|---|---|---|---|
| A. P. I. gravity | 50.8 | 52.3 | 54.6 |
| ASTM distillation: | | | |
| I. B. P. °F | 206 | 232 | 186 |
| 50% °F | 286 | 311 | 266 |
| E. P. °F | 412 | 392 | 373 |
| Sulfur, weight percent | 0.014 | 0.022 | 0.07 |
| Octane No. (F-1, clear) | 53.4 | 37.5 | 52.6 |
| Octane No. (F-1+3 cc. TEL) | 74.9 | 65.5 | 71.6 |

Each of these naphthas was reformed using catalyst E that had been in use for about six days. In each run, the liquid hourly space velocity was 2, the hydrogen-to-hydrocarbon molar ratio was 10, and the hydrogen pressure was 500 pounds per square inch gauge. The runs were carried out at several temperatures, in order to produce gasolines of various octane numbers. The pertinent data are set forth in Table IX.

TABLE IX

| Crude source of naphtha | Octane number, (F-1+3 cc. TEL) | 10# RVP gasoline vol. percent | Temperature, °F. |
|---|---|---|---|
| Guico | 90 | 111 | 840 |
| | 98 | 99.5 | 908 |
| Tibu | 90 | 102 | 875 |
| | 98 | 91 | 930 |
| Redwater | 90 | 108 | 840 |
| | 98 | 96 | 910 |

It will be noted, from the data set forth in Table IX, that good reforming was achieved even when the catalyst had been aged. These data also show that the process of this invention is applicable to various types of naphthas. The results obtained in Examples 19 through 21 show that the catalysts which fall within the specifications established on the basis of pure hydrocarbon runs, are equally effective when used in runs involving petroleum naphthas.

This application is a continuation-in-part of co-pending application, Serial Number 373,516, filed August 11, 1953.

Although the present invention has been described with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. A process for reforming hydrocarbon fractions having an initial boiling point of at least about 60° F. and an end boiling point of less than about 450° F. and boiling substantially continuously between said initial boiling point and said end boiling point, which comprises contacting said fractions with a catalyst that has a surface area that varies between about 650 square meters per gram and about 100 square meters per gram and which includes at least one metal selected from the group consisting of platinum and palladium, in amounts that vary between about 0.05 percent, by weight, and about 2 percent, by weight, deposited upon silica that contains alumina in amounts that vary between about 0.025 percent and about 7.0 percent, based on the weight of the catalyst and in which the relationship between the amount of the alumina and the surface area defines a point falling within the area delineated by points A, B, G and H in Fig. 8, at temperatures varying between about 700° F. and about 1000° F., at a liquid hourly space velocity varying between about 0.1 and about 10, in the presence of hydrogen under pressures varying between about 100 pounds per square inch gauge and about 1000 pounds per square inch gauge, and using a molar ratio of hydrogen to hydrocarbon charge varying between about 1 and about 20.

2. A process for reforming hydrocarbon fractions having an initial boiling point of at least about 60° F. and an end boiling point of less than about 450° F. and boiling substantially continuously between said initial boiling point and said end boiling point, which comprises contacting said fraction with a catalyst that has a surface area that varies between about 650 square meters per gram and about 100 square meters per gram and which includes at least one metal selected from the group consisting of platinum and palladium, in amounts that vary between about 0.05% by weight and about 2% by weight deposited upon silica that contains alumina cogelled therewith, in amounts that vary between about 0.05% and about 7%, based on the weight of the catalyst, and in which the relationship between the amount of the alumina and the surface area defines a point falling within the area delineated by points A, B, C and D in Fig. 3 at temperatures varying between about 700° F. and about 1000° F., at a liquid hourly space velocity varying between about 0.1 and about 10, in the presence of hydrogen under pressures varying between about 100 pounds per square inch gauge and about 1000 pounds per square inch gauge and using a molar ratio of hydrogen to hydrocarbon charge varying between about 1 and about 20.

3. A process for reforming hydrocarbon fractions having an initial boiling point of at least about 60° F. and an end boiling point of less than about 450° F. and boiling substantially continuously between said initial boiling point and said end boiling point, which comprises contacting said fractions with a catalyst that has a surface area that varies between about 650 square meters per gram and about 100 square meters per gram and which includes platinum, in amounts that vary between about 0.05% by weight and about 2% by weight deposited upon silica that contains alumina cogelled therewith in amounts that vary between about 0.13% and about 3.8%, based on the weight of the catalyst and in which the relationship between the amount of the alumina and the surface area defines a point falling on curve XY in Figure 3, at temperatures varying between about 725° F. and about 975° F., at a liquid hourly space velocity varying between about 0.5 and about 4, in the presence of hydrogen under pressures varying between about 350 pounds per square inch gauge and about 750 pounds per square inch gauge, and using a molar ratio of hydrogen to hydrocarbon charge varying between about 4 and about 12.

4. A process for reforming hydrocarbon fractions having an initial boiling point of at least about 60° F. and an end boiling point of less than about 450° F. and boiling substantially continuously between said initial boiling point and said end boiling point, which comprises contacting said fractions with a catalyst that has a surface area that varies between about 650 square meters per gram and about 100 square meters per gram and which includes palladium, in amounts that vary between about 0.05% by weight and about 2% by weight deposited upon silica that contains alumina cogelled therewith in amounts that vary between about 0.13% and about 3.8%, based on the weight of the catalyst and in which the relationship between the amount of the alumina and the surface area defines a point falling on curve XY in Figure 3, at temperatures varying between about 725° F. and about 975° F., at a liquid hourly space velocity varying between about 0.5 and about 4, in the presence of hydrogen under pressures varying between about 350 pounds per square inch gauge and about 750 pounds per square inch gauge, and using a molar ratio of hydrogen to hydrocarbon charge varying between about 4 and about 12.

5. A process for reforming hydrocarbon fractions having an initial boiling point of at least about 60° F. and an end boiling point of less than about 450° F. and boiling substantially continuously between said initial boiling point and said end boiling point, which comprises contacting said fractions with a catalyst that has a surface area that varies between about 650 square meters per gram and about 100 square meters per gram and which includes at least one metal selected from the group consisting of platinum and palladium, in amounts that vary between about 0.05% by weight and about 2% by weight deposited upon silica that contains alumina impregnated thereon in amounts that vary between about 0.025% and about 1% based on the weight of the catalyst and in which the relationship between the amount of the alumina and the surface area defines a point falling within the area delineated by points E, F, G and H in Figure 5, at temperatures varying between about 700° F. and about 1000° F., at a liquid hourly space velocity varying between about 0.1 and about 10, in the presence of hydrogen under pressures varying between about 100 pounds per square inch gauge and about 1000 pounds per square inch gauge, and using a molar ratio of hydrogen to hydrocarbon charge varying between about 1 and about 20.

6. A process for reforming hydrocarbon fractions having an initial boiling point of at least about 60° F. and an end boiling point of less than about 450° F. and boiling substantially continuously between said initial boiling point and said end boiling point, which comprises contacting said fractions with a catalyst that has a surface area that varies between about 650 square meters per gram and about 100 square meters per gram and which includes platinum in amounts that vary between about 0.05% by weight and about 2% by weight deposited upon silica that contains alumina impregnated thereon in amounts that vary between about 0.05% and about 0.5% based on the weight of the catalyst, and in which the relationship between the amount of the alumina and the surface area defines a point falling on curve RS in Figure 5, at temperatures varying between about 725° F. and about 975° F., at a liquid hourly space velocity varying between about 0.5 and about 4, in the presence of hydrogen under pressures varying between about 350 pounds per square inch gauge and about 750 pounds per square inch gauge, and using a molar ratio of hydrogen to hydrocarbon charge varying between about 4 and about 12.

7. A process for reforming hydrocarbon fractions having an initial boiling point of at least about 60° F. and an end boiling point of less than about 450° F. and boiling substantially continuously between said initial boiling point and said end boiling point, which comprises contacting said fractions with a catalyst that has a surface area that varies between about 650 square meters per gram and about 100 square meters per gram and which includes at least 1 metal selected from the group consisting of platinum and palladium, in amounts that vary between about 0.05% by weight and about 2% by weight, deposited upon silica that contains about 0.05% alumina cogelled therewith and is further impregnated with alumina, wherein the total amount of alumina varies between about 0.05% and about 1.9%, based on the weight of the catalyst, and in which the relationship between the amount of the alumina and the surface area defines a point falling within the area delineated by points K, L, M and N in Figure 7, at temperatures varying between about 700° F. and about 1000° F., at a liquid hourly space velocity varying between about 0.1 and about 10, in the presence of hydrogen under pressures varying between about 100 pounds per square inch gauge and about 1000 pounds per square inch gauge, and using a molar ratio of hydrogen to hydrocarbon charge varying between about 1 to about 20.

8. A process for reforming hydrocarbon fractions having an initial boiling point of at least about 60° F. and an end boiling point of less than about 450° F. and boiling substantially continuously between said initial boiling point and said end boiling point, which comprises contacting said fractions with a catalyst that has a surface area that varies between about 650 square meters per gram and about 100 square meters per gram and which includes platinum in amounts that vary between about 0.05% by weight and about 2% by weight, deposited upon silica that contains about 0.05% alumina cogelled therewith and is further impregnated with alumina, wherein the total amount of alumina varies between about 0.11% and about 0.94%, based on the weight of the catalyst, and in which the relationship between the amount of the alumina and the surface area defines a point falling on curve TU in Figure 8, at temperatures varying between about 725° F. and about 975° F., at a liquid hourly spaced velocity varying between about 0.5 and about 4, in the presence of hydrogen under pressures varying between about 350 pounds per square inch gauge and about 750 pounds per square inch gauge, and using a molar ratio of hydrogen to hydrocarbon charge varying between about 4 and about 12.

9. A process for reforming a petroleum naphtha which comprises contacting said naphtha with a catalyst that has a surface area of about 575 square meters per gram and which includes platinum in amounts that vary between about 0.05% by weight and about 2% by weight, deposited upon silica that contains alumina cogelled therewith, in an amount of about 0.4%, based on the weight of the catalyst, at temperatures varying between about 725° F. and about 975° F., at a liquid hourly space velocity varying between about 0.5 and about 4, in the presence of hydrogen under pressures varying between about 350 pounds per square inch gauge and about 750 pounds per square inch gauge, and using a molar ratio of hydrogen to hydrocarbon charge varying between about 4 and about 12.

10. The process defined in claim 3, wherein said hydrocarbon fraction having an initial boiling point of at least about 60° F. and an end boiling point of less than about 450° F. and boiling substantially continuously between said initial boiling point and said end boiling point contains between about 0.05% by weight and about 0.4% by weight of sulfur.

11. A process defined in claim 9 wherein said naphtha contains between about 0.05% by weight and about 0.4% by weight of sulfur.

12. A reforming catalyst that has a surface area that varies between about 650 square meters per gram and about 100 square meters per gram and which includes at least one metal selected from the group consisting of platinum and palladium, in amounts that vary between about 0.05 percent, by weight, and about 2 percent, by weight, deposited upon silica that contains alumina in amounts that vary between about 0.025% and about 7.0% based on the weight of the catalyst and in which the relationship between the amount of the alumina and the surface area defines a point falling within the area delineated by points A, B, G and H in Figure 8.

13. A reforming catalyst that has a surface area that varies between about 650 square meters per gram and about 100 square meters per gram and which includes at least one metal selected from the group consisting of platinum and palladium, in amounts that vary between about 0.05% by weight and about 2% by weight deposited upon silica that contains alumina cogelled therewith, in amounts that vary between about 0.05% and about 7%, based on the weight of the catalyst, and in which the relationship between the amount of the alumina and the surface area defines a point falling within the area delineated by points A, B, C and D in Figure 3.

14. A reforming catalyst that has a surface area that varies between about 650 square meters per gram and about 100 square meters per gram and which includes platinum, in amounts that vary between about 0.05% by weight and about 2% by weight deposited upon silica that contains alumina cogelled therewith in amounts that vary between about 0.13% and about 3.8%, based on the weight of the catalyst and in which the relationship between the amount of the alumina and the surface area defines a point falling on curve XY in Figure 3.

15. A reforming catalyst that has a surface area that varies between about 650 square meters per gram and about 100 square meters per gram and which includes palladium, in amounts that vary between about 0.05% by weight and about 2% by weight deposited upon silica that contains alumina cogelled therewith in amounts that vary between about 0.13% and about 3.8%, based on the weight of the catalyst and in which the relationship between the amount of the alumina and the surface area defines a point falling on curve XY in Figure 3.

16. A reforming catalyst that has a surface area that varies between about 650 square meters per gram and about 100 square meters per gram and which includes at least one metal selected from the group consisting of platinum and palladium, in amounts that vary between about 0.05% by weight and about 2% by weight deposited upon silica that contains alumina impregnated thereon in amounts that vary between about 0.025% and about 1% based on the weight of the catalyst and in which the relationship between the amount of the alumina and the surface area defines a point falling within the area delineated by points E, F, G and H in Figure 5.

17. A reforming catalyst that has a surface area that varies between about 650 square meters per gram and about 100 square meters per gram and which includes platinum in amounts that vary between about 0.05% by weight and about 2% by weight deposited upon silica that contains alumina impregnated thereon in amounts that vary between about 0.05% and about 0.5% based on the weight of the catalyst, and in which the relationship between the amount of the alumina and the surface area defines a point falling on curve RS in Figure 5.

18. A reforming catalyst that has a surface area that varies between about 650 square meters per gram and about 100 square meters per gram and which includes at least 1 metal selected from the group consisting of platinum and palladium, in amounts that vary between about 0.05% by weight and about 2% by weight, deposited upon silica that contains about 0.05% alumina cogelled therewith and is further impregnated with alumina, wherein the total amount of alumina varies between about 0.05% and 1.9%, based on the weight of the catalyst, and in which the relationship between the amount of the alumina and the surface area defines a point falling within the area delineated by points K, L, M and N in Figure 7.

19. A reforming catalyst that has a surface area that varies between about 650 square meters per gram and about 100 square meters per gram and which includes platinum in amounts that vary between about 0.05% by weight and about 2% by weight, deposited upon silica that contains about 0.05% alumina cogelled therewith and is further impregnated with alumina, wherein the total amount of alumina varies between about 0.11% and about 0.94%, based on the weight of the catalyst, and in which the relationship between the amount of the alumina and the surface area defines a point falling on curve TU in Figure 8.

20. A reforming catalyst that has a surface area of about 575 square meters per gram and which includes platinum in amounts that vary between about 0.05% by weight and about 2% by weight, deposited upon silica that contains alumina cogelled therewith, in an amount of about 0.4%, based on the weight of the catalyst.

References Cited in the file of this patent

UNITED STATES PATENTS

| | | |
|---|---|---|
| 2,478,916 | Haensel et al. | Aug. 16, 1949 |
| 2,550,531 | Ciapetta | Apr. 24, 1951 |
| 2,642,385 | Berger et al. | June 16, 1953 |
| 2,656,398 | De Vault | Oct. 20, 1953 |
| 2,694,673 | Kimberlin et al. | Nov. 16, 1954 |
| 2,763,623 | Haensel | Sept. 18, 1956 |

OTHER REFERENCES

"Control of Physical Structure of Silica-Alumina Catalyst," by Ashley et al., Ind. & Eng. Chem. (December 1952), vol. 44, No. 12, pages 2857 to 2863.

UNITED STATES PATENT OFFICE
CERTIFICATE OF CORRECTION

Patent No. 2,849,378                                                            August 26, 1958

Richard W. Baker et al.

It is hereby certified that error appears in the printed specification of the above numbered patent requiring correction and that the said Letters Patent should read as corrected below.

Column 1, line 51, for "is presence" read -- its presence --; column 3, line 75, for "patinum" read -- platinum --; column 4, line 18, for "impregnations" read -- impregnation --; column 5, line 14, for "chlorides" read -- chloride --; column 11, line 19, for "thet" read -- the --; columns 11 and 12, Table IV, under the heading "900° F." and sub-heading "Mole percent benzene", third line from bottom, for "819" read -- 81 --; column 13, line 4, before "basis" insert -- the --; column 14, line 13, for "where" read -- which --; line 69, for "hydroethermally" read -- hydrothermally --; column 16, line 66, for "useing" read -- using --.

Signed and sealed this 9th day of December 1958.

(SEAL)
Attest:

KARL H. AXLINE                                                      ROBERT C. WATSON
Attesting Officer                                              Commissioner of Patents